United States Patent [19]

Liechti et al.

[11] 4,327,018
[45] Apr. 27, 1982

[54] AZO DYES AND THE PRODUCTION AND USE THEREOF

[75] Inventors: Hans W. Liechti, Oberwil; Kurt Burdeska, Basel; Jürgen Markert, Ettingen, all of Switzerland

[73] Assignee: Ciba-Geigy Corporation, Ardsley, N.Y.

[21] Appl. No.: 75,861

[22] Filed: Sep. 17, 1979

Related U.S. Application Data

[63] Continuation of Ser. No. 855,100, Nov. 25, 1977, abandoned.

[30] Foreign Application Priority Data

Dec. 1, 1976 [LU] Luxembourg .......................... 76304

[51] Int. Cl.³ ............................................ C09B 29/36
[52] U.S. Cl. .................................. 260/156; 260/154; 260/146 R; 260/146 D; 548/182; 548/186; 548/189; 564/440; 564/441; 564/442
[58] Field of Search ............... 260/146 R, 156, 146 D, 260/154

[56] References Cited

U.S. PATENT DOCUMENTS

| | | | |
|---|---|---|---|
| 3,580,902 | 5/1971 | Angliker | 260/154 X |
| 3,640,674 | 2/1972 | Berrie et al. | 260/156 |
| 3,852,261 | 12/1974 | Steinnemann | 260/156 |
| 3,869,441 | 3/1975 | Hughes | 260/156 |
| 4,247,456 | 1/1981 | Von Brachol et al. | 260/156 |

FOREIGN PATENT DOCUMENTS

| | | | |
|---|---|---|---|
| 1917278 | 11/1970 | Fed. Rep. of Germany | 260/156 |
| 2002022 | 7/1971 | Fed. Rep. of Germany | 260/156 |
| 2162179 | 6/1973 | Fed. Rep. of Germany | 260/156 |
| 1360749 | 7/1974 | United Kingdom | 260/156 |
| 1377612 | 12/1974 | United Kingdom | 260/156 |
| 1377614 | 12/1974 | United Kingdom | 260/156 |

Primary Examiner—Paul F. Shaver
Attorney, Agent, or Firm—Edward McC. Roberts

[57] ABSTRACT

New azo dyes are disclosed which are free from sulphonic acid groups and which are optionally quaternized in the coupling component, and mixtures of such dyes, which dyes correspond to the formula

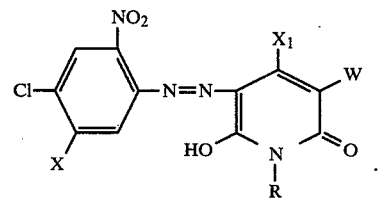

wherein X represents chlorine, optionally substituted phenyloxy, phenylmercapto, alkylmercapto, naphthyloxy, naphthylmercapto, or a heterocyclic radical which is bound by way of —O—, —NH— or —S—, $X_1$ represents hydrogen, cyano, lower alkoxy, carboxy, optionally branched and/or substituted alkyl having 1 to 12 carbon atoms, optionally branched and/or substituted lower alkenyl, optionally substituted cycloalkyl, aralkyl having 7 to 10 carbon atoms, aryl, carbamoyl, or a heterocyclic radical, W represents hydrogen, a cyano group, an optionally branched and/or substituted lower alkyl group, an optionally substituted cycloalkyl group, an aralkyl group (having 7 to 10 carbon atoms), an aryl group or the radicals

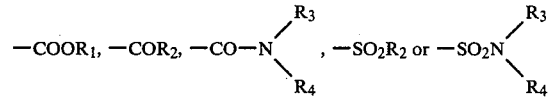

wherein $R_1$ and $R_2$ represent lower alkyl, $R_2$ also represents optionally substituted cycloalkyl, aralkyl or aryl, and $R_3$ and $R_4$ represent hydrogen, lower alkyl, hydroxyalkyl, lower alkoxyaryl, cycloalkyl, aralkyl or aryl, and the alkyl radicals $R_3$ and $R_4$ can also be bound direct or by way of a hetero atom, R represents hydrogen, optionally substituted amino, optionally branched and/or substituted alkyl, optionally branched and/or substituted alkenyl, optionally substituted cycloalkyl, aralkyl or aryl or a heterocyclic radical, which dyes are useful for the dyeing and printing of synthetic fibres, especially polyester fibres if non quaternized dyes are used or acrylic fibres if quaternized dyes are used.

3 Claims, No Drawings

AZO DYES AND THE PRODUCTION AND USE THEREOF

This is a continuation of application Ser. No. 855,100 filed on Nov. 25, 1977, now abandoned.

The present invention relates to new azo dyes which are free from sulphonic acid groups and which are optionally quaternised in the coupling component, and to mixtures thereof, which dyes correspond to the formula I

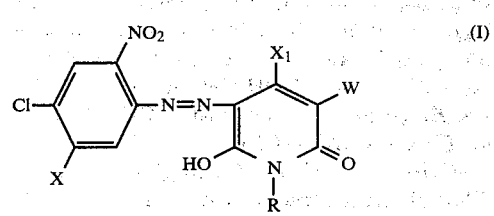

wherein X represents chlorine, optionally substituted phenyloxy, phenylmercapto, alkylmercapto, naphthyloxy, naphthylmercapto, or a heterocyclic radical which is bound by way of —O—, —NH— or —S—, $X_1$ represents hydrogen, cyano, lower alkoxy, carboxy, optionally branched and/or substituted alkyl having 1 to 12 carbon atoms, optionally branched and/or substituted lower alkenyl, optionally substituted cycloalkyl, aralkyl having 7 to 10 carbon atoms, aryl, carbamoyl, or a heterocyclic radical, W represents hydrogen, a cyano group, an optionally branched and/or substituted lower alkyl group, an optionally substituted cycloalkyl group, an aralkyl group (having 7 to 10 carbon atoms), an aryl group or the radicals

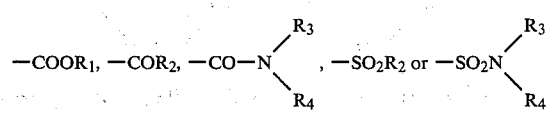

wherein $R_1$ and $R_2$ represent lower alkyl, $R_2$ also represents optionally substituted cycloalkyl, aralkyl or aryl, and $R_3$ and $R_4$ represents hydrogen, lower alkyl, hydroxyalkyl, lower alkoxyaryl, cycloalkyl, aralkyl or aryl, and the alkyl radicals $R_3$ and $R_4$ can also be bound direct or by way of a hetero atom, e.g. to a radical of the formulae

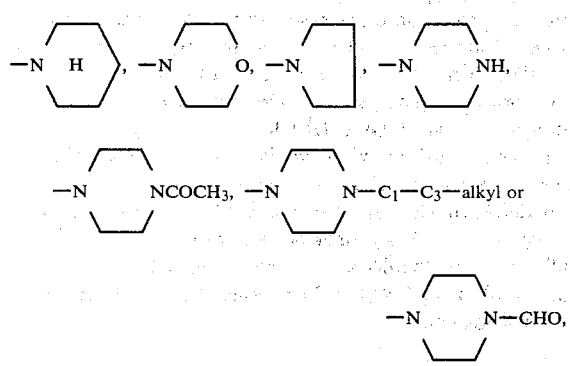

R represents hydrogen, optionally substituted amino, optionally branched and/or substituted alkyl, optionally branched and/or substituted alkenyl, optionally substituted cycloalkyl, aralkyl or aryl or a heterocyclic radical.

It is possible that the pyridone dyes of the aforementioned formula I exist in tautomeric forms, for example as is expressed by the following formula

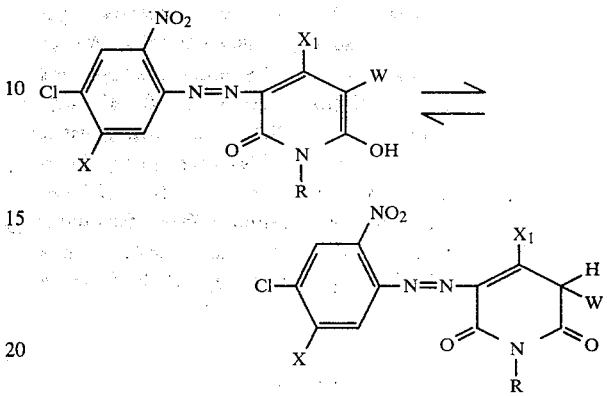

and so forth.

If R=H, the 2,6-dihydroxypyridine form can also exist.

As phenyloxy, phenylmercapto, naphthyloxy or naphthylmercapto and as a heterocyclic radical, X can carry substituents free from sulphonic acid groups, particularly lower alkyl (methyl, ethyl, butyl or amyl), lower alkoxy (methoxy, ethoxy or butoxy), chlorine, bromine, cyano, acetyl, hydroxyl, formylamino, nitro, trichloromethyl, $C_1$-$C_5$-alkanoylamino such as acetylamino, propionylamino, butyrylamino, benzoylamino (chloro-, nitro-, methyl)-benzoylamino, $C_1$-$C_5$-alkanoyloxy such as acetoxy, butyryloxy, carbo-$C_1$-$C_{12}$-alkoxy such as methoxycarbonyl, ethoxycarbonyl, butoxycarbonyl, dodecyloxycarbonyl, cyclohexyl, or phenyl which is optionally substituted by lower alkyl (methyl, ethyl, butyl or amyl), lower alkoxy (methoxy, ethoxy or butoxy), chlorine, bromine or cyano.

Alkylmercapto radicals denoted by X are those having 1 to 12 carbon atoms, e.g. methyl, ethyl, propyl, butyl, amyl, hexyl, octyl, dodecyl, hydroxyethyl or lower alkoxyethyl.

Lower alkyl, lower alkoxy or "low molecular," etc., signifies that the groups concerned have 1 to 4 carbon atoms.

The aformentioned alkyl groups can also be branched-chain.

In preferred azo dyes, X represents chlorine, optionally substituted phenyloxy or an alkylmercapto radical, and in particular the unsubstituted phenoxy radical, chlorine, the β-hydroxyethylmercapto radical, and a heterocyclic radical bound by way of —S—, especially the benzthiazolylmercapto radical.

Examples which may be mentioned of alkyl groups denoted by R are alkyl groups containing 1 to 12 carbon atoms, such as methyl, ethyl, propyl, butyl, amyl, hexyl, octyl, decyl and dodecyl groups. The substituted alkyl groups expressed by R are preferably lower alkyl groups, for example hydroxy-lower alkyl, such as β-hydroxyethyl, lower alkoxy-lower alkyl such as β-ethoxyethyl and γ-methoxypropyl, phenyl-lower alkyl such as benzyl and β-phenylethyl, cyano-lower alkyl such as β-cyanoethyl, lower alkoxycarbonyl-lower alkyl such as ethoxycarbonylmethyl and β-(methoxycarbonyl)-ethyl, lower alkylcarbonyloxy-lower alkyl such as β-acetoxyethyl, chlorinated lower alkyl such as β-chloroethyl, phenoxy-lower alkyl such as β-phenoxyethyl, phenylthio-lower alkyl such as β-phenylthioethyl, lower alkyl which is substituted by heterocyclic radicals, such as β-pyrid-2-ylethyl and β-tetrahydrofur-2-ylethyl, monocyclicarylcarbonyl-lower alkyl, such as β-(benzoyloxy)-ethyl and β-(m-methylbenzoyloxy)-ethyl, acyl-lower alkyl such as benzoylmethyl, lower alkylcarbonyl-lower alkyl such as acetylmethyl and β-acetylethyl, phenylsulphonylmethyl and β-(ethylsulphonyl)-ethyl, amino-lower alkyl and N-substituted derivatives thereof, such as β-aminoethyl, γ-dimethylaminopropyl, β-(acetylamino)-ethyl, β-(benzoylamino)-ethyl and β-succinimidoethyl. Examples which may be mentioned of aryl and substituted aryl groups denoted by R are phenyl groups of the formula

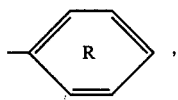

wherein the ring B can be substituted by chlorine or bromine atoms, nitro, trifluoromethyl, methyl, ethyl, propyl, butyl, methoxy, ethoxy, propoxy, butoxy, methylsulphonyl, ethylsulphonyl, phenoxysulphonyl, (methyl-, ethyl-, propyl-, butyl)-carbonylamino, benzoylamino, (methyl-, ethyl-, propyl-, butyl)-sulphonylamino, aminosulphonyl, N-(methyl, ethyl-, propyl-, butyl)-aminosulphonyl, —CH$_2$—C$_6$H$_5$, —CH$_2$CH$_2$—C$_6$H$_5$, —C$_6$H$_{11}$—, —C$_6$H$_5$—, —(CH$_2$)$_{1-6}$—O—CO—(methyl, ethyl, propyl, butyl) or 13 (CH$_2$)$_{1-3}$-NH—CO—(methyl, ethyl, propyl, butyl, hexyl) groups.

Examples which may be mentioned of cycloalkyl groups R are cyclohexyl and trimethylcyclohexyl. Examples of substituted amino groups denoted by R are arylamino groups and substituted arylamino groups, such as aniline, anisidine, toluidine, chloroaniline and bromoaniline, particularly however N-lower alkylamino and N,N-di-lower alkylamino groups, such as methylamino, diethylamino and N-methyl-N-n-propylamino groups and also benzylamino and cyclohexylamino groups. Examples which may be mentioned of heterocyclic groups denoted by R are pyrid-2-yl, fur-2-yl, thiazolyl-2-benzthiazolyl-2, imidazolyl-2, thienyl and pyrrolyl.

In addition, R can be an optionally substituted amino group, such as NH$_2$, NHCH$_3$, N(CH$_3$)$_2$, —N(CH$_2$CH$_3$)$_2$, —NHC$_2$H$_5$, —NHC$_5$H$_{11}$, —NHC$_{12}$H$_{25}$, —NHC$_2$H$_4$OH, —NHC$_2$H$_4$NH$_2$,

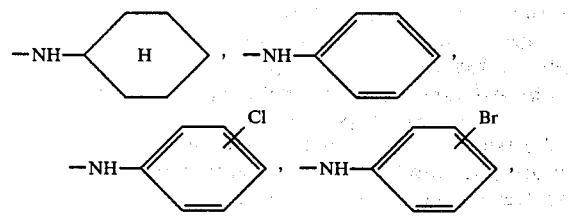

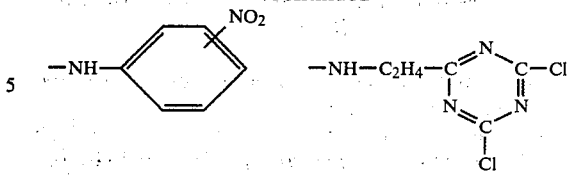

Suitable radicals R$_1$ are, e.g., lower alkyl (methyl, ethyl, propyl or butyl), hydroxyethyl, hydroxy-lower-alkyl (such as C$_2$H$_4$OH), lower-alkoxy-lower-alkyl (such as CH$_3$—O—C$_3$H$_7$—), lower-alkanoyl-lower-alkyl (such as —C$_2$H$_4$—O—CO—CH$_3$), —CH$_2$CH$_2$OCH$_3$, —CH$_2$CH$_2$CH$_2$OCH$_3$, —CH$_2$CH$_2$CN, —CH$_2$CH$_2$OH, —CH$_2$CH$_2$O(CHO, COCH$_3$ or OOC$_2$H$_5$), —CH$_2$—CH(OH)—CH$_3$, —CH$_2$—CH(OH)—C$_2$H$_5$, —CH$_2$—C(OCOCH$_3$)—CH$_2$Cl, —CH$_2$C(OH)HC$_6$H$_5$, phenyl, and phenyl optionally substituted by chlorine or bromine, nitro, trifluoromethyl, methyl, ethyl, propyl, butyl, methoxy, ethoxy, propoxy, butoxy, methylsulphonyl, ethylsulphonyl, phenoxysulphonyl, (methyl-, ethyl-, propyl-, butyl)-carbonylamino, benzolyamino (methyl-, ethyl-, propyl-, butyl)-sulphonylamino, aminosulphonyl, N-(methyl-, ethyl-, propyl-, butyl)-aminosulphonyl, N,N-di-(methyl-, ethyl-, propyl-, butyl)-aminosulphonyl, such as

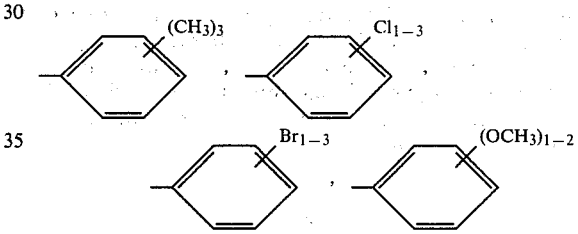

R$_2$ represents as a rule lower alkyl, R$_3$ and R$_4$ are each hydrogen, optionally substituted C$_1$-C$_8$-alkyl, with appropriate substituents being halogen atoms, preferably fluorine, chlorine or bromine atoms, phenyl, lower alkoxy, lower alkyl-carbonyloxy, lower-alkylcarbonylamino, benzoyloxy, benzoylamino (and the benzoyl groups can be substituted by chlorine, bromine, methyl, ethyl, methoxy and ethoxy groups), cyano, hydroxyl, phenoxy, phenylcarbonyl, phenylsulphonyloxy, phenoxycarbonyl, phenylthio (and the phenyl groups in each case can be substituted by chlorine, bromine, methyl, ethyl, methoxy or ethoxy), lower-alkylsulphonyl, lower-alkoxycarbonyloxy, phenoxycarbonyloxy and phenylaminocarbonyloxy, aminocarbonyl, mono-lower-alkylaminocarbonyl, di-lower-alkylaminocarbonyl, lower-alkylcarbonyl, succinimido, phthalimido, lower-alkoxycarbonyl, cinnamoyl, thiophenecarbonyl, pyridinecarbonyl, phenoxyalkylcarbonyloxy, phenylaminoalkylcarbonyloxy, (lower-alkoxy- or phenloxy)-carbonylalkylcarbonyl-(oxy or amino) groups. R$_2$ and R$_4$ can together form a radical of the formulae

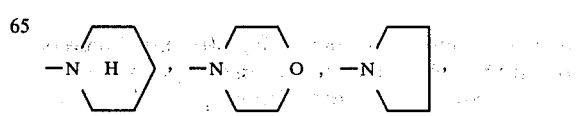

-continued

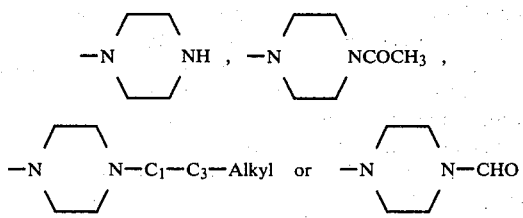

The alkyl groups $X_1$ are preferably lower alkyl groups, such as methyl, ethyl, propyl and butyl. The substituted alkyl groups $X_1$ are preferably substituted lower alkyl groups such as phenyl-lower alkyl, for example benzyl, phenethyl, chlorobenzyl, nitrobenzyl, cyano-lower alkyl such as cyanomethyl, lower alkoxy-lower alkyl such as β-methyoxyethyl, phenoxy-lower alkyl such as β-phenoxyethyl, lower alkyl which is substituted by heterocyclic groups such as pyrid-2-ylmethyl and thiazol-2-ylmethyl, and lower alkoxycarbonyl-lower alkyl such as ethoxycarbonylmethyl. The substituted carbamoyl groups denoted by $X_1$ are preferably N-lower alkylcarbamoyl and N,N-di-lower alkylcarbamoyl, such as N-methylcarbamoyl and N,N-diethylcarbamoyl.

Preferred azo dyes are those of the formula

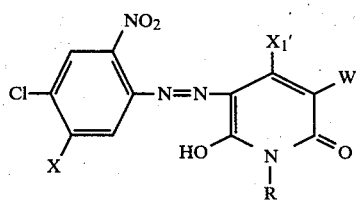

wherein X, R and W are the same as under the formula I, and $X_1'$ represents hydrogen, carbamoyl, lower alkyl, cyclohexyl having up to 4 methyl groups, aryl or heterocyclic radical, with these radicals being optionally substituted.

A particularly valuable subgroup of the aforementioned azo dyes is formed by the pyridone dyes of the formula

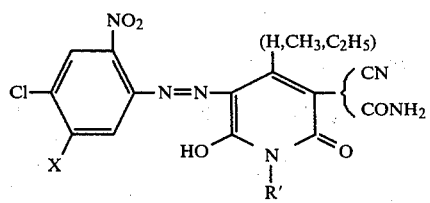

wherein X has the meaning given under the formula I, and R' represents hydrogen or a lower alkyl group, particularly the methyl, ethyl, propyl, isopropyl or butyl group.

Further valuable azo dyes are those of the formula

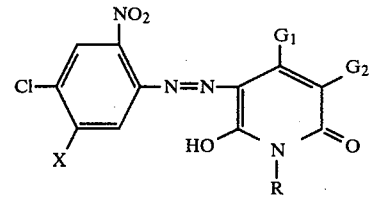

wherein $G_1$ and $G_2$ represent lower alkyl groups, and X and R have the same meanings as under the formula I. This type is derived, e.g., from the following coupling components of the formula:

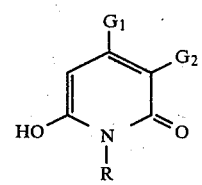

3,4-dimethyl-1-ethyl-6-hydroxypyrid-2-one,
3,4-dimethyl-6-hydroxy-1-n-propylhydrid-2-one,
1-n-butyl-3,4-dimethyl-6-hydroxypyrid-2-one,
3,4-dimethyl-1-(2')-ethylhexyl-6-hydroxypyrid-2-one,
3,4-dimethyl-6-hydroxy-1-n-octylpyrid-2-one,
3,4-dimethyl-6-hydroxy-1-phenylethylpyrid-2-one,
1-β-acetylaminoethyl-3,4-dimethyl-6-hydroxypyrid-2-one,
1,3-diethyl-6-hydroxy-4-methylpyrid-2-one,
1-butyl-3-ethyl-6-hydroxy-4-methylpyrid-2-one,
3-butyl-1-ethyl-6-hydroxy-4-methylpyrid-2-one,
3-butyl-1-(2')-ethylhexyl-6-hydroxy-4-methylpyrid-2-one,
3,4-dimethyl-6-hydroxy-(4'-sulpho)-phenylethylpyrid-2-one, 3-butyl-6-hydroxy-4-methyl-1-(4'-sulpho)-benzylpyrid-2-one.

Finally, azo dyes of special interest are those of the formula

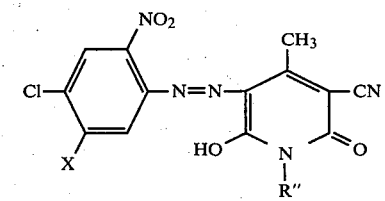

wherein R'' represents alkyl having 1 to 4 carbon atoms.

These azo dyes of the formula I are obtained by a process comprising coupling the diazonium compound of an aniline of the formula II

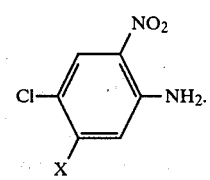

with a coupling component which is free from water-solubilising acid groups and which corresponds to formula III

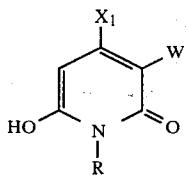 (III)

in which formulae the symbols X, X₁, W and R have the given meanings; and then optionally quaternising the azo dye formed, if it contains quaternisable nitrogen atoms in the coupling component, by treatment with alkylating agents.

The following are to be mentioned as special examples of coupling components of the formula III: 2,6-dihydroxypyridine, 2,6-dihydroxy-3-cyano-4-methyl-pyridine, 1-(methyl- or ethyl)-3-cyano-4-methyl-6-hydroxypyrid-2-one, 1-(β-hydroxyethyl- or γ-methoxypropyl)-3-cyano-4-(methyl-, phenyl- or ethyl)-6-hydroxypyrid-2-one, 1-(phenyl-, p-tolyl- or p-anisyl)-3-cyano-4-(methyl- or phenyl)-6-hydroxypyrid-2-one, 1-phenyl-3-(carbonamido-, carboxy- or carbethoxy)-4-(methyl- or phenyl)-6-hydroxypyrid-2-one, 2,6-dihydroxy-3-(carbonamido-, carbethoxy-, carbodiethylamido)-4-methylpyridine, 2,6-dihydroxy-3-(carbonamido- or carbethoxy)-pyridine, 2,6-dihydroxy-3-carbonamido-4-phenylpyridine, 2,6-dihydroxy-3-cyano-4-carbonamido-pyridine, 2,6-dihydroxy-3-cyano-4-(carboxy-, carbomethoxy- or carboethoxy)-pyridine, ethyl-2,6-dihydroxy-3-cyanopyrid-4-ylacetate, 2,6-dihydroxy-3-cyanopyrid-4-ylacetamide, 2,6-dihydroxy-3,4-di-(carboxy- or carboethoxy)-pyridine, 2,6-dihydroxy-3-aminocarbonyl-4-carboethoxypyridine, 2,6-dihydroxy-4-methylpyridine, ethyl-2,6-dihydroxy-iso-nicotinate, 2,6-dihydroxy-iso-nicotinamide, 2,6-dihydroxy-iso-nicotinic acid-diethylamide, 2,6-dihydroxy-4-cyanopyridine, 2,6-dihydroxy-4-phenylpyridine, 2,6-dihydroxy-4-(p-hydroxyphenyl)-pyridine, 2,6-dihydroxy-4-(p-methoxyphenyl)-pyridine, 2,4,6-trihydroxy-pyridine, 2,6-dihydroxy-3-cyano-4-ethoxycarbonylmethylpyridine, 4-methyl-1-ethyl-3-aminocarbonyl-6-hydroxy-pyrid-2-one and 4-methyl-1-phenyl-3-aminocarbonyl-6-hydroxypyrid-2-one, 1-β-aminoethyl-3-cyano-4-methyl-6-hydroxypyrid-2-one, 1-β-aminoethyl-3-cyano-4-phenyl-6-hydroxypyridin-2-one, 1-γ-aminopropyl-3-cyano-4-methyl-6-hydroxypyrid-2-one, 1-(β-aminoethyl)-3-carboxy-4-methyl-6-hydroxypyrid-2-one, 1-β-aminoethoxyethyl-3-cyano-4-methyl-6-hydroxypyrid-2-one, 1-β-aminopropyl-3-cyano-4-methyl-6-hydroxypyrid-2-one, 1-β-aminopropyl-3-cyano-4-phenyl-6-hydroxypyrid-2-one, 1-(N-aminoethylamino)-ethyl-3-cyano-4-methyl-6-hydroxypyrid-2-one, 1-(β-aminoethyl)-3-cyano-4-carboxyethyl-6-hydroxypyrid-2-one, 1-(β-aminoethyl)-3-cyano-4-cyclohexyl-6-hydroxypyrid-2-one, (1-(β-aminoethyl)-3-cyano-4-(3'-pyridyl)-6-hydroxypyrid-2-one, 1-(β-aminopropyl)-3-cyano-4-carbondimethylamido-6-hydroxypyrid-2-one, 1-β-methylaminoethyl-3-cyano-4-methyl-6-hydroxypyrid-2-one, 1-β-phenylaminoethyl-3-cyano-4-methyl-6-hydroxypyrid-2-one, 1-β-ethylaminoethyl-3-cyano-4-methyl-6-hydroxypyrid-2-one 1-β-aminoethyl-4-methyl-3-aminocarbonyl-6-hydroxypyrid-2-one, 1-(3'- and 4'-aminophenyl)-4-methyl-3-aminocarbonyl-6-hydroxypyridin-2-one, 1-(3'- and 4'-aminophenyl)-4-methyl-3-cyano-6-hydroxypyrid-2-one, 1-(3'-amino-4'-methylphenyl)-3-cyano- and -3-aminocarbonyl-4-methyl-6-hydroxypyrid-2-one and 1-(3'-amino-4'-methoxyphenyl)-3-cyano- and -3-aminocarbonyl-6-hydroxypyid-2-one.

The diazo components of the formula II wherein X has the aforegiven meaning, with the exception of chlorine, can be obtained by reaction of 2-nitro-4,5-dichloroaniline with phenols, alkylmercaptans, phenylthio compounds, naphthols, thionaphthols or, e.g., 2-mercapto-benzthiazole, in the presence of alkali.

Suitable hydroxyl and mercapto compounds are, e.g., phenol, mono- and polyalkylphenols, e.g. 2-, 3- or 4-methyl-, ethyl-, n-propyl-, isopropyl-, n-butyl-, isobutyl-, tert.-butyl-, n- or isopentyl-, n- or isohexyl-, n- or isoheptyl-, n- or isododecyl-, n- or isopalmityl-, ethane-, propene-, butene- and ethinephenols, 2,3-, 2,4-, 2,5-, 2,6-, 3,4-, 3,5-dimethyl-, diethyl- and dipropylphenols, 2,3,4-, 2,3,5-, 2,3,6-, 3,4,5-, 2,4,6-trimethyl-, triethyl- and tripropylphenols, 2,3,4,6-, 2,3,4,5-, 2,3,5,6-tetramethyl-, tetraethyl- and tetrapropylphenols and 2,3,4,5,6-pentamethylphenol. The above-mentioned alkyl groups can also be mixed, e.g. 2,6-dimethyl-4-tert.-butylphenol, cycloalkylphenols, e.g. 2-, 3- or 4-cyclohexylphenol; substituted alkylphenols, e.g. 4-chloromethyl-, 4-hydroxymethyl- and 3-trifluoromethylphenol; aralkylphenols, e.g. 2-, 3- or 4-benzylphenols, arylphenols, e.g. 2-, 3- or 4-hydroxydiphenyl, p-phenylphenol, o-phenylphenol, alkyl-, aryl-, acylaminophenols, e.g. 2-, 3- or 4-acetylamino-, 2-, 3- or 4-benzoylaminophenols, 2-, 3- or 4-methacroylaminophenol, N-methyl-N-formyl-4-aminophenol, halogenophenols, e.g. 2-, 3- or 4-chloro- or -bromophenol, 2,3-, 2,4-, 2,5-, 2,6-, 3,4-, 3,5-dichloro(-bromo)-phenol; pentachlorophenol; 2-methyl-5-chloro-, 2-methyl-6-chloro-, 3-methyl-4-chloro-, 5-methyl-2-chloro-, 2-methyl-4-chloro- or 2-methyl-3-chlorophenol 3,5,3',5'-tetrachloro-2,2'-dihydroxydiphenyl; nitrophenols, e.g. 2-, 3- or 4-nitrophenol, 2-methyl-5-nitro-, 4-methyl-2-nitro-, 3-methyl-4-nitro-, 4-methyl-3-nitro- or 3,5-dimethyl-4-nitrophenol; hydroxyphenylsulphonic and -phenylcarboxylic acids, and esters thereof, amides, e.g. 3- or 4-hydroxybenzoic acid or -benzenesulphonic acid, 2-, 3- or 4-hydroxybenzoic acid (or -benzenesulphonic acid)-methyl ester, -propyl ester, -isobutyl ester, -phenyl ester, -naphthyl ester, -halogenophenyl ester, 2-hydroxy-5-chlorobenzoic acid ester, 2-cyanato-3-methylbenzoic acid ester, 2-, 3- or 4-hydroxybenzoic acid dimethylamide, -diethylamide, -morpholylamide, -piperidylamide, salicylic acid anilide; alkoxy-, aryloxy- or acyloxyphenols, e.g. 2-, 3- or 4-methoxy-, ethoxy-, propoxy-, isopropoxy-, butoxy-, phenoxy-, acetoxy-, benzoxy-, N,N-dialkylcarbamate- or 4-allyl-2-methoxyphenol; acylphenols, e.g. 2-, 3- or 4-acetylphenol, propionyl- or benzoylphenol, 4-acetyl-1,3-dihydroxybenzene; cyanophenols, e.g. 2-, 3- or 4-cyanophenol, phenols having S-containing substituents, e.g. 2-, 3- or 4-methylmercapto-, -ethylmercapto-, -propylmercapto-, -phenylmercapto-, -acetylmercapto- or -benzoylmercaptophenols, 3- or 4-mercaptophenols, 2,4-bismethylmercapto-3-methylphenol, α-naphthol, β-naphthol, 1-acetylamino-7-hydroxynaphthalene, 1-hydroxy-4-chloronaphthalene, 1-hydroxy-5,8-dichloronaphthalene, 8-hydroxyquinoline, 5-chloro-8-hydroxyquinoline, also thiophenol, 2-mercaptonaphthalene, methyl-, ethyl-, propyl-, butyl-, hexyl- and dodecylmercaptan.

Instead of using a homogeneous diazo component, it is also possible to use a mixture of two or more of the diazo components according to the invention, and instead of a homogeneous coupling component, a mixture of two or more of the coupling components according to the invention.

The diazotisation of the diazo components mentioned can be performed, e.g., with a solution of nitrosylsulphuric acid in concentrated sulphuric acid.

The coupling can likewise be performed in a manner known per se, e.g. in a neutral to acid medium, optionally in the presence of sodium acetate or similar buffer substances or catalysts influencing the rate of coupling, such as dimethylformamide, pyridine, or salts thereof.

The coupling is advantageously performed also with combination of the components in a combining nozzle. By this is meant a device wherein the liquids to be mixed together are combined in a comparatively small space, with at least one liquid being fed preferably under elevated pressure through a nozzle. The combining or mixing nozzle can be designed, for example, on the principle of the water jet pump, with the feeding of the one liquid in the combining nozzle corresponding to the water feed in the water jet pump, and the supply of the other liquid to the combining nozzle corresponding to that of the compound in the vessel (to be evacuated) of the water jet pump, whereby this latter liquid supply or feed likewise being effected under elevated pressure.

If the radicals of the coupling components contain nitrogen atoms which can be quaternised, the azo dyes can be quaternised, which is preferably performed as the last step.

Quaternisation is performed by treatment with esters of strong mineral acids or organic sulphonic acids, such as dimethylsulphate, diethylsulphate, alkyl halides such as methyl chloride, methyl bromide or methyl iodide, aralkyl halides such as benzyl chloride, esters of low-molecular alkanesulphonic acids, e.g. with the methyl ester of methane-, ethane- or butanesulphonic acid, and the alkyl esters of (4-methyl-, 4-chloro- or 3- or 4-nitro)-benzene sulphonic acid, which form as anions halogen anions, sulphuric acid half-ester anions and alkane- or benzenesulphonic acid anions, preferably with heating in inert organic solvents, for example xylene, carbon tetrachloride, o-dichlorobenzene and nitrobenzene. It is also possible to use however solvents such as acetic acid anhydride, dimethylformamide, acetonitrile or dimethylsulphoxide. The quaternised dyes contain as anion $Y^-$ preferably the radical of a strong acid, such as of sulphuric acid or half-esters thereof, or a halide ion, but they can also be used as double salts, e.g. with zinc chloride, or as free bases.

The new azo dyes of the formula I are characterized by good fastness to light, pH stability, depth of colour and fastness to sublimation.

Preferred azo dyes are those which are not quaternised and which belong to the class of disperse dyes.

The water-insoluble dyes, their mixtures with each other and their mixtures with other dyes are excellently suitable for dyeing and printing leather, wool, silk and, in particular, synthetic fibres, for example acrylic or acrylonitrile fibres, made from polyacrylonitrile or from copolymers made from acrylonitrile and other vinyl compounds, such as acrylic esters, acrylic amides, vinylpyridine, vinyl chloride or vinylidene chloride, or from copolymers from dicyanoethylene and vinylacetate, and also from acrylonitrile-block copolymers, fibres from polyurethanes, polypropylene fibres, especially from polypropylene fibres modified with metals, particularly with nickel, such as cellulose tri- and 2½-acetate, and especially fibres from polyamides such as nylon 6, nylon 6—6 or nylon 12, and from aromatic polyesters such as those from terephthalic acid and ethylene glycol, or 1,4-dimethylcyclohexane, and copolymers from terephthalic and isophthalic acid and ethylene glycol. The dyes belong to the disperse dye class.

The present invention relates therefore also to a process for dyeing or printing textile material based on synthetic fibres, particularly on polyester fibres or, if the dyes are quaternised, on acrylic fibres.

For dyeing in aqueous liquors, the water-insoluble dyes are used advantageously in a finely divided form, and dyeing is performed with the addition of dispersing agents such as sulphite cellulose liquor or synthetic detergents, or a combination of various wetting and dispersing agents. It is advantageous as a rule to convert the azo dyes to be used, before the dyeing operation, into a dye preparation which contains a dispersing agent and the finely divided dye in such a form that on dilution of the dye preparations with water there is formed a fine dispersion. Such dye preparations can be obtained in a known manner, e.g. by grinding the dye in the dry or wet form, with or without the addition of dispersing agents during the grinding process.

In order to obtain strong dyeings on polyethylene terephthalate it proves advantageous to add to the dye bath a swelling agent, or alternatively to perform the dyeing process under pressure at temperatures above 100° C., for example at 130° C. Suitable swelling agents are aromatic carboxylic acids, for example salicylic acid, phenols such as for example o- or p-oxydiphenyl, aromatic halogen compounds such as o-dichlorobenzene, or diphenyl.

For thermofixing the dye, the padded polyester fabric is heated, advantageously after previous drying, e.g. in a warm stream of air, to temperatures of above 100° C., for example between 180° and 210° C.

The dyeings obtained according to the present process can be subjected to an aftertreatment, for example by heating with an aqueous solution of an ion-free detergent.

Instead of being applied by impregnation, the given dyes can according to the present process also be applied by printing. For this purpose there is used for example a printing dye containing, in addition to the auxiliaries customary in the printing industry, such as wetting and thickening agents, the finely dispersed dye.

Full dyeings and printings having good fastness properties are obtained by the present process. Equally good fastness properties are obtained with use of the dyes in the transfer printing process, in which the dyes are applied from a provisional carrier, e.g. paper, by sublimation to the textile substrate; or in the case of application from solvents the dyes are applied from a solvent, in which the dye is dissolved or is present as a fine dispersion, to the textile article to be dyed. Suitable solvents are, e.g., petroleum fractions and, in particular, chlorinated hydrocarbons (e.g. perchloroethylene), which can be used on their own or in the form of a dispersion with water.

The new water-insoluble dyes can also be used for the dope dyeing of polyamides, polyesters and polyolefins. The polymer to be dyed is mixed, advantageously in the form of powders, granules or chips, as a finished spinning solution or in the melted state, with the dye which is introduced in the dry condition or in the form of a dispersion or solution in an optionally volatile solvent. After homogeneous dispersion of the dye in the solution or melt of the polymer, the mixture is processed in a known manner by casting, moulding or extrusion into the form of fibres, yarns, monofilaments, films, etc.

The quaternised dyes obtained by the process contain as anion preferably the radical of a strong acid, for example of sulphuric acid, or half-esters thereof, or of an arylsulphonic acid, or a halogen ion. The mentioned anions, introduced according to the process into the dye molecule, can also be replaced by anions of other inorganic acids, for example of phosphoric acid, sulphuric acid, or of organic acids, such as formic acid, lactic acid or tartaric acid; it is also possible in certain cases to use the free bases. The dye salts can be used also in the form of double salts, for example with halides of elements of the second group of the periodic system, particularly zinc chloride or cadmium chloride.

The quaternised dyes and dye salts obtained according to the invention are suitable for dyeing and printing the widest variety of fully synthetic fibres, such as polyvinyl chloride fibres, polyamide fibres, polyurethane fibres, basically modified polypropylene fibres or basically modified polyester fibres, particularly however polyacrylonitrile fibres.

The quaternised water-soluble dyes have in general low electrolyte sensitivity, and some have exceptionally good solubility in water or polar solvents. Dyeing with the quaternised, water-soluble dyes is generally performed in an aqueous, neutral or acid medium, at boiling temperature under atmospheric pressure, or in a closed vessel at elevated temperature and pressure. The commercial levelling agents can be used.

The invention relates further to amines of the formula IV

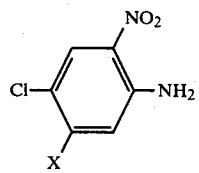

wherein X represents alkylmercapto, naphthyloxy, naphthylmercapto, or a heterocyclic radical which is bound by way of -O-, -NH- or -S-, as intermediate products.

Preferred amines are those of the formulae

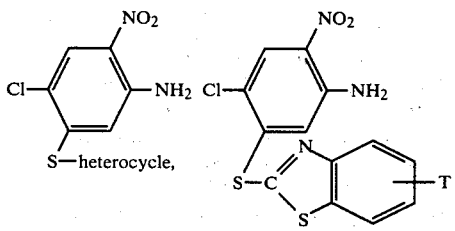

wherein T is hydrogen, O-C$_{1-2}$-alkyl, -S-C$_{1-2}$-alkyl, NO$_2$, Cl, Br or C$_{1-3}$-alkyl,

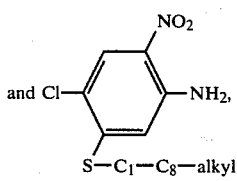

particularly those wherein the alkyl group has 1 to 5 carbon atoms and is branched-chain.

These intermediates serve as diazo components for the production of azo dyes.

Except where otherwise stated in the following Examples, the term 'parts' denotes parts by weight, percentages are given as percent by weight, and the temperature values are in degrees Centigrade.

EXAMPLE 1

20.7 parts of 2-nitro-4,5-dichloroaniline are diazotised in a mixture of acetic acid and hydrochloric acid with a sodium nitrite solution. The clear diazo solution is poured, at 10° and at pH 4 to 5, into an aqueous solution of 16.4 parts of 1,4-dimethyl-3-cyano-6-hydroxy-2-pyridone.

Coupling occurs immediately and the monoazo dye precipitates completely. The coupling mixture is heated to 90° and is stirred for one hour at this temperature. After cooling to 50°, the dye is filtered off, washed with water and dried. There are thus obtained 37 parts of the dye of the formula

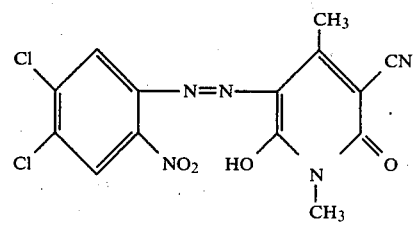

It produces in microdisperse distribution on polyester materials, in the high-temperature process, carrier process, thermofixing process and printing process, a brilliant, greenish-yellow shade. This has a high degree of fastness to light and to sublimation. The brilliant green shades, which are obtained by the addition of blue polyester dyes, are equally fast to light, i.e. there occurs no catalytic fading.

In the following Table are listed further dyes according to the present invention, which correspond to the general formula

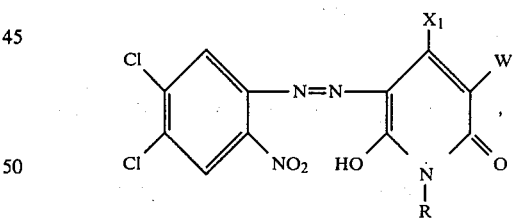

and which produce on polyester materials yellow dyeings and printings that likewise possess very good fastness properties:

| Example | $X_1$ | W | R |
|---|---|---|---|
| 1 | CH$_3$ | CN | C$_2$H$_5$ |
| 2 | CH$_3$ | CN | n-C$_3$H$_7$ |
| 3 | CH$_3$ | CN | i-C$_3$H$_7$ |
| 4 | CH$_3$ | CN | n-C$_4$H$_9$ |
| 5 | CH$_3$ | CN | n-C$_5$H$_{11}$ |
| 6 | CH$_3$ | CN | n-C$_6$H$_{13}$ |

High temperature dyeing 1 part of the dye obtained according to Example 1 is wet ground with 2 parts of a 50% aqueous solution of the sodium salt of dinaphthylmethanedisulphonic acid, and dried.

This dye preparation is stirred up with 40 parts of a 10% aqueous solution of the sodium salt of N-benzyl-heptadecylbenzimidazoledisulphonic acid and 4 parts of a 40% acetic acid solution. A dye bath of 4000 parts is prepared from this by dilution with water.

100 parts of a dispersed polyester fibrous material is introduced into this bath at 50°; the temperature is raised within half an hour to 120° to 130°, and dyeing is performed at this temperature for one hour in a closed vessel. A full greenish-yellow dyeing having excellent fastness to light and to sublimation is obtained.

EXAMPLE 2

26.45 parts of 2-chloro-4-nitro-5-amino-1,1'-diphenyl ether are diazotised in a mixture of acetic acid and hydrochloric acid with a sodium nitrite solution. The clear diazo solution is poured, at 10° and at pH 4 to 5, into an aqueous solution of 16.4 parts of 1,4-dimethyl-3-cyano-6-hydroxy-2-pyridone.

The coupling occurs immediately and the monoazo dye precipitates completely. The coupling mixture is heated to 90° and is stirred for one hour at this temperature. After cooling to 50°, the dye is filtered off, washed with water and dried. There is thus obtained 42 parts of the dye of the formula

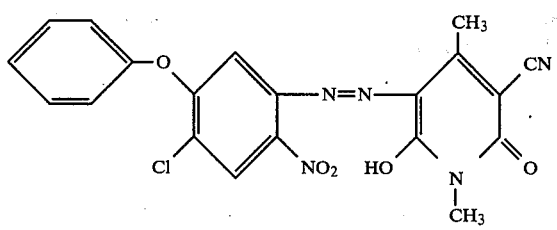

It produces in microdisperse distribution on polyester materials, in the high-temperature process, carrier process, thermofixing process and printing process, a brilliant, greenish-yellow shade. This has a high degree of fastness to light and to sublimation. The brilliant green shades which are obtained by the addition of blue polyester dyes are equally fast to light, i.e. there occurs no catalytic fading. The excellent pH stability of this dye in the dye bath and in the printing paste is also to be emphasized.

In the following Table are listed further dyes according to the present invention, which correspond to the general formula

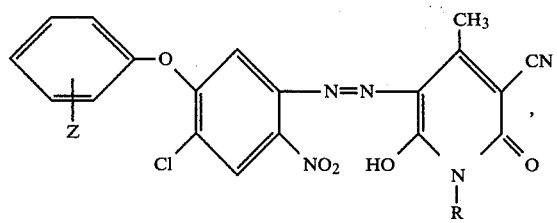

and which produce on polyester materials yellow dyeings and printings which likewise possess very good fastness properties.

| Example No. | Z | R |
|---|---|---|
| 1 | H | $C_2H_5$ |
| 2 | H | $n\text{-}C_3H_7$ |
| 3 | H | $i\text{-}C_3H_7$ |
| 4 | H | $n\text{-}C_4H_9$ |
| 5 | H | $n\text{-}C_5H_{11}$ |
| 6 | H | $n\text{-}C_6H_{13}$ |
| 7 | $o\text{-}CH_3$ | $CH_3$ |
| 8 | $o\text{-}CH_3$ | $C_2H_5$ |
| 9 | $o\text{-}CH_3$ | $n\text{-}C_3H_7$ |
| 10 | $o\text{-}CH_3$ | $n\text{-}C_4H_9$ |
| 11 | $o\text{-}CH_3$ | $n\text{-}C_6H_{13}$ |
| 12 | $m\text{-}CH_3$ | $CH_3$ |
| 13 | $m\text{-}CH_3$ | $C_2H_5$ |
| 14 | $p\text{-}CH_3$ | $CH_3$ |
| 15 | $p\text{-}CH_3$ | $C_2H_5$ |
| 16 | $p\text{-}CH_3$ | $n\text{-}C_4H_9$ |
| 17 | $p\text{-}OCH_3$ | $CH_3$ |
| 18 | $p\text{-}OCH_3$ | $C_2H_5$ |
| 19 | $p\text{-}CH_3CH_2\text{-}CH(CH_3)\text{-}$ | $CH_3$ |
| 20 | $p\text{-}CH_3CH_2\text{-}CH(CH_3)\text{-}$ | $C_2H_5$ |
| 21 | $p\text{-}CH_3CH_2\text{-}CH(CH_3)\text{-}$ | $n\text{-}C_4H_9$ |
| 22 | $p\text{-}CH_3\text{-}CH_2\text{-}C(CH_3)_2\text{-}$ | $CH_3$ |
| 23 | $p\text{-}CH_3\text{-}CH_2\text{-}C(CH_3)_2\text{-}$ | $C_2H_5$ |
| 24 | $p\text{-}CH_3\text{-}CH_2\text{-}C(CH_3)_2\text{-}$ | $n\text{-}C_4H_9$ |
| 25 | $p\text{-}Cl$ | $CH_3$ |
| 26 | $p\text{-}Cl$ | $C_2H_5$ |
| 27 | $p\text{-}Cl$ | $n\text{-}C_4H_9$ |
| 28 | $p\text{-}Cl$ | $n\text{-}C_6H_{13}$ |

EXAMPLE 3

28.05 parts of 2-chloro-4-nitro-5-aminodiphenyl-thioether are diazotised in a mixture from acetic acid and hydrochloric acid with sodium nitrite solution. The clear diazo solution is added at 10° and at pH 4 to 5 to an aqueous solution of 16.4 parts of 1,4-dimethyl-3-cyano-6-hydroxy-2-pyridone. Coupling occurs immediately and the monoazo dye precipitates immediately.

The coupling mixture is heated to 90° and is stirred for one hour at this temperature. After cooling to 50°, the dye is filtered off, washed with water and dried. There are thus obtained 44 parts of the dye of the formula

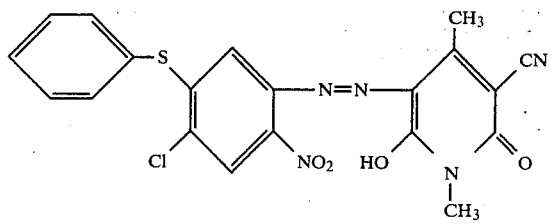

It produces in microdisperse distribution on polyester materials, in the high-temperature process, carrier process, thermofixing process and printing process, a brilliant yellow shade. This has a high degree of fastness to light and to sublimation.

In the following Table are listed further dyes according to the present invention, which correspond to the general formula

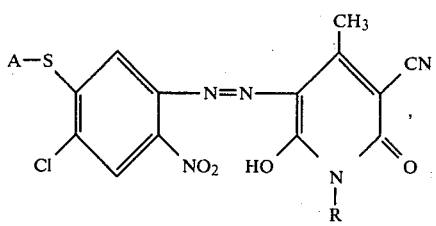

and which produce on polyester materials yellow dyeings and printings which likewise possess very good fastness properties.

| Example No. | | R |
|---|---|---|
| 1 | HO—CH$_2$—CH$_2$ | CH$_3$ |
| 2 | HO—CH$_2$—CH$_2$ | C$_2$H$_5$ |
| 3 | HO—CH$_2$—CH$_2$ | n-C$_3$H$_7$ |
| 4 | HO—CH$_2$—CH$_2$ | i-C$_3$H$_7$ |
| 5 | HO—CH$_2$—CH$_2$ | n-C$_4$H$_9$ |
| 6 | HO—CH$_2$—CH$_2$ | n-C$_6$H$_{13}$ |
| 7 | 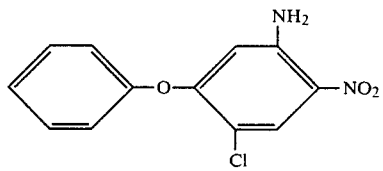 | CH$_3$ |
| 8 | (same structure) | C$_2$H$_5$ |
| 9 | (same structure) | n-C$_4$H$_9$ |

Production of the diazo components

The diazo components used in the Examples can be produced from 4,5-dichloro-2-nitroaniline by the process customary for diphenyl ethers, such as, in particular, by reaction in solvents containing alkali hydroxide, or alternatively by means of phase transfer catalysis, for example according to Belgian patent specification No. 841,726.

EXAMPLE 4

To a solution of 4.93 parts (0.052 mole) of phenol in 8 parts of a 30% sodium hydroxide solution are added 10.35 parts (0.05 mole) of 2-nitro-4,5-dichloroaniline, 1.2 parts of the catalyst tetrabutylammonium bromide and 40 parts of chlorobenzene, and this mixture is heated in an autoclave with stirrer for 8 hours at 110°, with a slight pressure of 0.8 to 0.9 bar being developed. After cooling, the employed chlorobenzene is separated by means of steam distillation to leave 5-amino-2-chloro-4-nitrodiphenyl ether of the structure

[structure: phenyl-O-phenyl with NH$_2$, NO$_2$, Cl substituents]

in a yield of 12.2 parts=92% of theory as a dark-yellow-dyed product having a melting point of 132° to 135°.

By using, instead of phenol, equimolar amounts of the phenols listed in column I of the following Table and of the halobenzenes given in column II, with the procedure otherwise being as described in this Example, there are obtained the diaryl ethers shown in column III.

TABLE

| Ex. | I Phenol | II Halobenzene | III Diaryl ether |
|---|---|---|---|
| 1 | [phenol-OH] | [Cl, O$_2$N, NH$_2$, NO$_2$ benzene] | [phenyl-O-benzene with O$_2$N, NH$_2$, NO$_2$] |
| 2 | [3-nitrophenol] | [Cl, Cl, NH$_2$, NO$_2$ benzene] | [3-nitrophenyl-O-benzene with Cl, NH$_2$, NO$_2$] |
| 3 | [4-chlorophenol] | " | [4-Cl-phenyl-O-benzene with Cl, NH$_2$, NO$_2$] |

TABLE-continued

| Ex. | I Phenol | II Halobenzene | III Diaryl ether |
|---|---|---|---|
| 4 | F₃C—⟨⟩—OH | " | F₃C—⟨⟩—O—⟨⟩(NH₂)(NO₂)(Cl) |
| 5 | 3,5-(H₃C)₂C₆H₃—OH | " | 3,5-(H₃C)₂C₆H₃—O—⟨⟩(NH₂)(NO₂)(Cl) |
| 6 | H₃C—⟨⟩—OH | " | H₃C—⟨⟩—O—⟨⟩(NH₂)(NO₂)(Cl) |
| 7 | H₃CO—⟨⟩—OH | " | H₃CO—⟨⟩—O—⟨⟩(NH₂)(NO₂)(Cl) |

If thiophenols are used instead of phenols, the reaction proceeds in an analogous manner, but occurs at lower temperatures.

EXAMPLE 5

6.2 parts of 2-nitro-4,5-dichloroaniline are diazotised in a mixture of glacial acetic acid and hydrochloric acid with sodium nitrite solution. The clear diazo solution is poured, at 10° and at pH 4 to 5, into an aqueous solution of 7.05 parts of 1-dimethylaminopropyl-3-cyano-4-methyl-6-hydroxy-2-pyridone.

Coupling occurs immediately and the monoazo dye precipitates completely. It is filtered off, washed with water and dried. There are thus obtained 13.5 parts of the dye of the formula

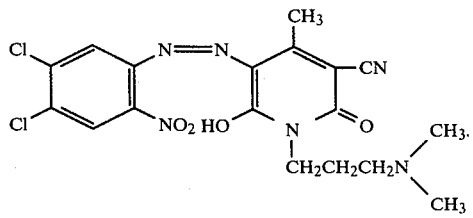

Five parts of this dye are heated with 40 parts of dimethylsulphate at 90° to 95° for three hours. After cooling, the reaction mixture is poured onto 200 parts of 10% sodium chloride solution. The dye is completely precipitated by the addition of zinc chloride, and then filtered off. It is dissolved in hot water, filtered with active charcoal and salted out from the filtrate. The quaternised dye of the formula

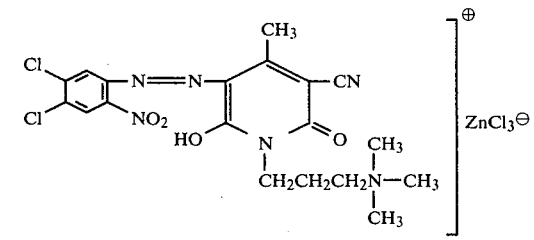

dyes polyacrylonitrile fibres, such as Orlon, in a fast yellow shade.

In the following Table are listed further dyes according to the present invention, which correspond to the general formula

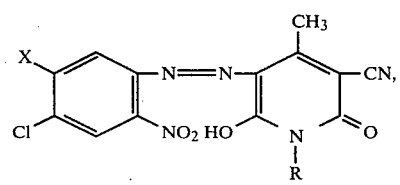

which produce on polyacrylonitrile materials fast yellow dyeings, and which can be produced by a procedure analogous to that of Example 5.

TABLE

| Example No | X | R |
|---|---|---|
| 1 | Cl | C₂H₄N(CH₃)₃⁺ |
| 2 | Cl | C₂H₄N⁺(CH₃)(CH₂C₆H₅)(CH₃) |
| 3 | C₆H₅—O— | C₃H₆N⁺(CH₃) |

TABLE-continued

| Example No | X | R |
|---|---|---|
| 4 | ⌬–O | C$_2$H$_4$N(CH$_3$)$_3^{\oplus}$ |
| 5 | ⌬–S | C$_3$H$_6$N(CH$_3$)$_3^{\oplus}$ |
| 6 | ⌬–S | C$_2$H$_4$N(CH$_3$)$_3^{\oplus}$ |
| 7 | HOC$_2$H$_4$–S | C$_3$H$_6$N(CH$_3$)$_3^{\oplus}$ |
| 8 | HOC$_2$H$_4$–S | C$_3$H$_6$N$^{\oplus}$(CH$_3$)(CH$_3$)–CH$_2$–⌬ |
| 9 | HOC$_2$H$_4$–S | C$_2$H$_4$N(CH$_3$)$_3^{\oplus}$ |

What is claimed is:

1. An azo dye of the formula

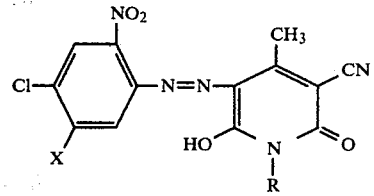

wherein

R is alkyl of 1 to 4 carbon atoms; and

X is chloro or phenoxy.

2. A dye according to claim 1, whrein X is chloro.

3. A dye according to claim 1, wherein X is phenoxy.

* * * * *